United States Patent Office 3,736,126
Patented May 29, 1973

3,736,126
GOLD RECOVERY FROM AQUEOUS SOLUTIONS
James S. Fritz, Ames, and William G. Millen, Cedar Rapids, Iowa, assignors to the United States of America as represented by the United States Atomic Energy Commission
No Drawing. Filed Sept. 24, 1971, Ser. No. 183,659
Int. Cl. C22b 11/04
U.S. Cl. 75—118                    10 Claims

ABSTRACT OF THE DISCLOSURE

Gold is separated from an aqueous solution and from other metal ions in an aqueous solution by acidifying the solution and adding chloride ion to complex the gold ions present, thus forming a feed solution, and passing the feed solution through an adsorption bed of a polymer of an acrylic or methacrylic ester which selectively adsorbs the gold ions while permitting other metal ions to pass through the bed.

CONTRACTUAL ORIGIN OF THE INVENTION

The invention described herein was made in the course of, or under, a contract with the United States Atomic Energy Commission.

BACKGROUND OF THE INVENTION

This invention relates to a method for separating gold from an aqueous solution. More specifically, this invention relates to a method for separating gold from other metal ions contained in an aqueous solution.

Of considerable economic importance to any country is its supply of gold, for both its monetary value and its industrial uses. An important source of gold is from scrap metal and from industrial waste process solutions where it may be found mixed with other metals. However, present methods for the recovery of gold from these sources are not completely efficient and some of the metal is lost. Also, some of the gold is mixed with other metals such as platinum from which separation is difficult.

SUMMARY OF THE INVENTION

We have developed a method for recovering gold from aqueous solutions such as aqueous industrial process solutions by acidifying the solution and adding chloride ion to the solution to complex the gold, thus forming a feed solution and passing the feed solution through an adsorption bed, said adsorption bed selected from the group consisting of polymers of lower aliphatic esters of acrylic acid and lower aliphatic esters of methacrylic acid whereby the gold is adsorbed on the bed. By our method, gold can also be separated from other metals by preparing an acidified aqueous solution of the metals, adding chloride ion to complex the gold present in the aqueous solution, passing the solution through an adsorption bed whereby the gold ions are selectively adsorbed on the bed and washing the other metal ions from the bed.

The method of this invention may also have utility in the recovery of gold from sea water where the gold is present in quantities too small to make recovery by ordinary methods economically feasible.

It is therefore one object of this invention to provide a method of separating gold from aqueous solutions.

It is another object of this invention to provide a method for separating gold from other metals.

Finally, it is an object of this invention to provide a method of separating gold from other metals from which separation is difficult by ordinary means.

DESCRIPTION OF THE PREFERRED EMBODIMENT

These and other objects of this invention may be met by acidifying an aqueous solution of gold, adding chloride ion to the solution to complex the gold, thus forming a feed solution, and passing the feed solution through an adsorption bed of a polymer of an acrylic or methacrylic ester whereby the gold is adsorbed on the bed. The gold can then be stripped from the bed and recovered for use.

In a similar manner, gold can be separated from other metals by preparing an aqueous solution of the metals, acidifying the solution and adding chloride ion to the solution to complex the gold, thus forming a feed solution, and passing the feed solution through an adsorption bed of a polymer of an acrylic or methacrylic ester which selectively adsorbs the gold and permits the other metal ions to pass through the bed and washing the bed with an aqueous acid solution to remove all the unadsorbed metal ions from the bed. The gold may then be stripped from the adsorption bed.

The aqueous solution when acidified need be only weakly acidic, for example, a pH of about 6, and may range to very strongly acidic. The solution can be acidified with any acid, although nitric acid is preferred and hydrochloric acid is especially preferred.

The amount of chloride ion to be added to the aqueous solution is dependent upon the concentration of gold ion in the solution. Since the gold-chloride complex is $AuCl_4^-$, four ions of chloride are necessary to complex each ion of gold present in the solution. Thus, the effective amount of chloride ion to be added to the solution is the amount necessary to complex the gold ion present in the solution to $AuCl_4^-$. The chloride ion may be added as a salt, for example, sodium chloride, or as an acid, for example, HCl. It is preferred that HCl be added to the solution, since it will both acidify and add chloride ions. It was found convenient to make the solution 1 M in HCl which would adjust the solution to a pH of 0 and provide sufficient chloride ion to complex the gold ion present. However, suitable HCl concentrations may range from 0.01 M to 12 M, although too strong an acid concentration may affect the adsorption bed.

There are no known upper or lower limits to the concentrations of metal ions which may be present in the feed solution. Quantitative results have been obtained in the recovery of gold in concentrations as small as 0.55 milligram of gold per liter of solution.

The adsorption bed may be polymers of lower aliphatic esters of acrylic acid, for example, methyl acrylate, ethyl acrylate, propyl acrylate, isopropyl acrylate, butyl acrylate and tert-butyl acrylate, and the corresponding esters of methacrylic acid.

Particularly good results were achieved using polymers marketed by Rohm and Haas Company, Philadelphia, Pa., under the trademarks Amberlite XAD-7 and Amberlite XAD-8. These polymers are described by the manufacturer as macroreticular resinous adsorbents which are hard, insoluble beads of porous polymer of acrylic esters with intermediate polarity and having the following characteristics.

|  | XAD-7 | XAD-8 |
|---|---|---|
| Helium porosity: |  |  |
| Vol. percent | 55.0 | 52.4 |
| Cm.³/gm | 1.080 | 0.822 |
| Mercury porosity: |  |  |
| Vol. percent | 48.2 | 51.9 |
| Cm.³/gm | 1.144 | 0.787 |
| Surface area (m.²/gram) | 450 | 140 |
| Average pore diameter (Å.) | 90 | 235 |
| Skeletal density (grams/cm.³) | 1.251 | 1.259 |

The adsorbent bed wash solution may suitably be water provided that a limited amount is used to prevent elution of the adsorbed gold ions, due to a breakdown of the gold-chloride complex. An aqueous solution of HCl is preferred in a concentration of about 0.01 M or greater to prevent any possibility of elution of the gold ion. The bed should be washed until all the unadsorbed metal ions are removed from the bed.

The gold ions may be stripped from the bed with water, although large quantities will be required. The preferred stripping agent is an organic solvent such as dimethyl formamide and the ketones, although acetone is the most preferred. Although the acetone worked well full strength, it was found preferable to dilute it with an aqueous solution of HCl to prevent gas formation in the adsorption bed. A convenient dilution was found to be a ratio of acetone to 1 M HCl of 2.5:1.

The gold may readily be recovered from the stripping solution by methods known to those skilled in the art. For example, the organic solvent could be allowed to evaporate or the gold could be reduced by electrolysis.

The adsorption column may readily be regenerated by washing with a solution of 1 M HCl to remove any acetone or metal ions which may have remained thereupon.

It is important that care be taken to ensure that the gold ions remain in the trivalent state, since the method of this invention is not operable in the separation of monovalent gold ions.

In order to recover the gold from other metals, it is necessary to first prepare an aqueous solution of these metals. This may suitably be accomplished by first treating the metals with concentrated HCl or $HNO_3$ to dissolve the lesser metals before adding either HCl or $HNO_3$ to form aqua regia and to dissolve the gold. Once the metals are in solution, the aqua regia may then be diluted with water to a concentration which will make it easier to work with and also to prevent gassing within the adsorbent bed which may result from too high an acid concentration. Chloride ion, as, for example, NaCl or HCl, is then added to the dilute solution and the pH adjusted to form the feed solution which may then be passed through the adsorbent bed and the gold separated therefrom in the manner previously described.

Following is a discussion of the theory of operation of the process of this invention. We do not, however, wish to be bound by this discussion. It is believed that the gold ion is complexed by the chloride ion to $AuCl_4^-$ and forms an ion pair with a cation such as $H_3O^+$, and that it is this ion pair which is taken up by the resin. It is further believed that the oxygen of the resin forms a weak bond with some part of the ion pair.

The following examples are given to illustrate the process of the invention and are not to be taken as limiting the scope of the invention.

EXAMPLE I

An adsorption bed was prepared by crushing and screening to a mesh size of 80–100 Amberlite XAD–7 resin. The resin was washed with alternating solutions of 6 M HCl and acetone before forming a slurry of the resin with 1 M HCl. A column 4–5 cm. was packed in a 1-cm. tube using the slurry. The resin was held in the column by a plug of glass wool. When packed, a flow rate of about 2–3 ml. per minute is attained.

A 10-ml. solution of 1 M HCl is prepared containing 1.5 micromoles of gold(III) and is passed through the column. The column is washed with 8 ml. of 1 M HCl solution to wash any unadsorbed metal ions from the column. It was observed that the gold was sorbed as a tight yellow band at the top of the column. The gold was stripped by passing 7 ml. of a solution of 2.5:1 acetone: 1 M HCl through the column. The gold was analyzed spectrophotometrically and it was determined that 100% of the gold in the solution was recovered.

EXAMPLE II

To determined the ability of the column to sorb gold from a very dilute solution, 1 liter of $2.79 \times 10^{-6}$ M gold in 1 M HCl was passed through the column described in Example I. On stripping of the gold with the acetone-HCl solution described previously, the gold was analyzed spectrophotometerically and it was determined that a recovery of 100.8% was obtained for the gold.

EXAMPLE III

A number of solutions were prepared as above containing gold and other metal ions and passed through adsorption beds of Amberlite XAD–7 and XAD–8 prepared as described before. The results are given in the table below.

TABLE I.—SEPARATIONS OF GOLD(III) FROM OTHER METAL IONS

| Metal ion | Metal added, μmoles | Au added, μmoles | Au found,[1] μmoles | Difference, μmoles |
| --- | --- | --- | --- | --- |
| Al(III) | 100 | 2.79 | 2.77 | −0.02 |
| Bi(III) | 100 | 2.79 | 2.78 | −0.01 |
| Ca(II) | 140 | 2.79 | 2.80 | +0.01 |
| Cd(II) | 100 | 2.79 | 2.77 | −0.02 |
| Ce(IV) | 100 | 2.79 | 2.78 | −0.01 |
| Co(II) | 100 | 2.79 | 2.80 | +0.01 |
| Cr(III) | 100 | 2.79 | 2.77 | −0.02 |
| Cu(II) | 100 | 2.79 | 2.80 | +0.01 |
| Fe(III) | 200 | 2.79 | 2.78 | −0.01 |
| Hg(II) | 100 | 2.79 | 2.78 | −0.01 |
| Mn(II) | 100 | 2.79 | 2.81 | +0.02 |
| Ni(II) | 100 | 2.79 | 2.78 | −0.01 |
| Pb(II) | ([2]) | 2.79 | 2.79 | 0.00 |
| Pd(II) | 100 | 2.79 | 2.79 | 0.00 |
| Pt(IV) | 100 | 2.79 | 2.80 | +0.01 |
| Ru(IV) | 100 | 2.79 | 2.83 | +0.04 |
| Sb(V) | 60 | 2.79 | 2.78 | −0.01 |
| Sn(IV) | 100 | 2.79 | 2.78 | −0.01 |
| U(VI) | 200 | 2.79 | 2.77 | −0.02 |
| Zn(II) | 100 | 2.79 | 2.81 | +0.02 |
| Cu(II) | 2800 | 2.79 | 2.79 | 0.00 |
| Fe(III) | 2800 | 2.79 | 2.78 | −0.01 |
| Zn(II) | 2800 | 2.79 | 2.78 | −0.01 |

[1] Average of 2 or 3 individual results.
[2] Used 2 ml. of a concentrated solution of $PbCl_2$ in 1 M hydrochloric acid.

It can be seen from the table that quantitative separation and recovery of gold was obtained in all cases. Bismuth is slightly sorbed by the resin and required approximately 11 ml. of 1 M HCl wash prior to elution of the gold. The volume of samples containing large amounts of iron, copper and zinc were larger (about 11 ml.) but the volume of additional 1 M HCl wash was no greater than that used for other samples.

EXAMPLE IV

To test for anion interference, 5–10 ml. solutions containing gold and small amounts of several anions and passed through columns of Amberlite XAD–7 and XAD–8 were prepared as described above. The results are shown in Table II below.

TABLE II.—SEPARATION AND RECOVERY OF GOLD(III) IN THE PRESENCE OF OTHER ANIONS

| Anion added | Mmoles of anion | Au added, μmoles | Au found, μmoles | Difference, μmoles |
| --- | --- | --- | --- | --- |
| $ClO_4^-$ | ∼3.0 | 2.79 | 2.76 | −0.03 |
| $NO_3^-$ | ∼7.9 | 2.79 | 2.78 | −0.01 |
| $PO_4^{3-}$ | ∼3.6 | 2.79 | 2.78 | −0.01 |
| $SO_4^-$ | ∼3.6 | 2.79 | 2.76 | −0.03 |

It can be seen from the above that the method of this invention results in the quantitative recovery of gold from aqueous solution and the quantitative separation of gold from other metals.

It will be understood that the invention is not to be limited to the details given herein but that it may be modified within the scope of the appended claims.

The embodiments of the invention in which an exclusive property or privilege is claimed are defined as follows:

1. A method of separating gold from an aqueous solution comprising: making the solution acidic, adding chloride ion to the solution to complex the gold, thereby forming a feed solution, passing the feed solution through an adsorption bed, said adsorption bed selected from the group consisting of polymers of lower aliphatic esters of acrylic acid and polymers of lower aliphatic esters of methacrylic acid, whereby said gold is adsorbed on the bed.

2. The method of claim 1 wherein the feed solution is from 0.01 M to 12 M HCl.

3. The method of claim 2 wherein the solution is 1.0 M HCl.

4. The method of claim 3 wherein the gold is stripped from the adsorption bed with acetone.

5. The method of claim 4 wherein the gold is stripped with a solution of 2.5 parts acetone to 1 part of 1 M HCl.

6. A method of separating gold from other metals comprising: dissolving the metals in an aqueous solution, making the solution acidic, adding chloride ion to the solution to complex the gold, thereby forming a feed solution, passing the feed solution through an adsorption bed, said adsorption bed selected from the group consisting of polymers of lower aliphatic esters of acrylic acid and polymers of lower aliphatic esters of methacrylic acid, whereby the gold is selectively adsorbed on the bed, passing a wash solution through the bed, said wash solution selected from the group consisting of water and aqueous solutions of HCl, thereby washing the unadsorbed metal ions from the bed, thereby separating the gold from the other metals.

7. The method of claim 6 wherein the feed solution is from 0.01 M to 12 M HCl.

8. The method of claim 7 wherein the solution is 1.0 M HCl.

9. The method of claim 8 wherein the gold is stripped from the adsorption bed with acetone.

10. The method of claim 9 wherein the gold is stripped with a solution of 2.5 parts acetone to 1 part of 1 M HCl.

References Cited

Kraus, K. A., et al., Anion-Exchange Studies, Ion Exchange in Concentrated Electrolytes, Gold(III) in Hydrochloric Acid Solutions, in J. Am. Chem. Soc., 76, pp. 984–987 (1954).

OSCAR R. VERTIZ, Primary Examiner

S. B. SHEAR, Assistant Examiner

U.S. Cl. X.R.

75—101 BE; 423—25